July 23, 1935.  H. B. HARTMAN  2,009,231
FLUID MIXING APPARATUS
Filed Aug. 6, 1931
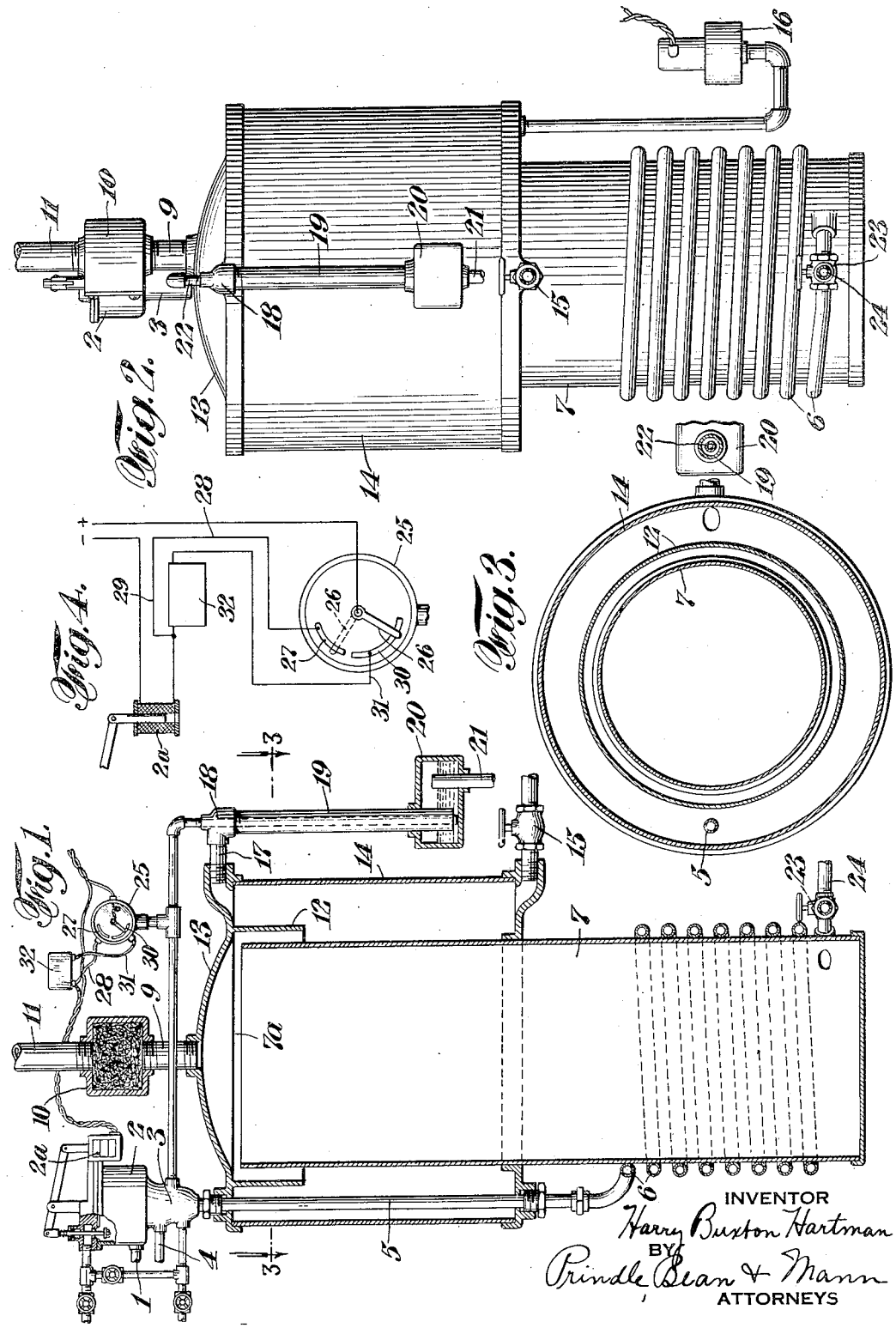

Patented July 23, 1935

2,009,231

UNITED STATES PATENT OFFICE 2,009,231

FLUID MIXING APPARATUS

Harry Buxton Hartman, Buffalo, N. Y.

Application August 6, 1931, Serial No. 555,512

13 Claims. (Cl. 210—27)

The object of my invention is to provide apparatus for the purpose of intimately mixing a gas with a fluid and particularly of mixing ozone with water, for the purpose of purifying the latter, which shall have among other advantages those of combining simplicity, with a degree of efficiency not obtainable in any apparatus having as low a cost and occupying as small a space. My invention is capable of embodiment in many different forms, and while I have chosen for the purpose of illustration, the best embodiment thereof which is known to me, my invention is not to be limited to the said embodiment; but the claims herein are to be construed as covering the various forms of apparatus by which the same functions can be performed in the same way to obtain the same results.

In the accompanying drawing:

Figure 1 is a vertical sectional view of said illustrative embodiment of my invention;

Figure 2 is a side elevation of said apparatus viewed from a position 90° from the point of view of Figure 1.

Figure 3 is a horizontal sectional view taken on the line 3—3 of Figure 1.

Figure 4 represents a diagrammatic view of the electrical mechanism for controlling the flow of water through the injector.

In purification of water with ozone, it is necessary to release the air or oxygen accompanying the ozone from the water, before the water is turned in the mains or pipes which distribute it for use. This is generally accomplished by the use of a tank separate from that into which the emulsion of water and ozonized gas is delivered from the ozone treating or mixing device, and this tank is open to the atmosphere, so that the entrained gas may escape from the water, the water for use being drawn from the bottom of the tank. My present invention accomplishes this purpose with increased compactness and economy of cost, by combining the receiving tank with the mixing device. The efficiency of the separation of the ozonized gas from the water, prior to the delivery of water to the distributing means, is increased.

Also in the purification of water with ozone, it is essential that the ozonized gas be dispersed throughout the water as finely as possible so as to provide a large surface of water, so to speak, in contact with ozonized gas, in order that sufficient ozone may be absorbed to insure purification of the water. The first step of purification of water with the ozone after the latter has been manufactured, is the "emulsification" or mixing of the ozone with the water, the most economical means being an injector. Sufficient time however, must be afforded for the ozone to act, if purification is to be obtained and the time of passage of the water and ozone through the injector is insufficient. I have provided means for prolonging the time-interval of contact between the water and the gas, by means which not only afford sufficient time but keeps the water and the ozone thoroughly mixed during the said interval.

In the accompanying drawing, water from a source of supply enters my apparatus through an inlet pipe 1, and passes through a device which preferably comprises an electrically controlled valve 2, a solenoid 2a and an injector 3 which may be of any desired form such as that described in my copending application for patent, Serial No. 509,061, filed January 16, 1931. When solenoid 2a is energized by the electric current from the control circuit, the magnet plunger or core will raise and operate the lever connected to it and depress the stem of the valve attached to the lever and the stem will open the pilot valve which will allow flow of water from above the piston of valve 2 to raise and open the large valve. This permits the full flow of water through the machine as long as the magnet is energized. When the current is cut off from the solenoid, the plunger drops and closes the pilot valve and shuts off the water supply to stop the operation of the machine. By the action of the injector ozonized air is drawn through a pipe 4 from any suitable source and mixed in the injector, by the aforesaid water and passes through the tail pipe 5 of the injector into a coil 6, which surrounds a mixing tank which I shall call the vortex chamber 7. The said coil is of relatively small cross-section and is of sufficient length so that, due to the rapid passage through it of the water and gas, the gas is maintained dispersed throughout the water in an emulsified condition and coalescence either of the water or the gas is prevented. The emulsified mixture passes from the said coil on into the mixing chamber in a direction tangential to the wall of the said chamber so that an emulsified condition is maintained by avoidance of any abrupt change of direction of flow, said emulsion being whirled spirally upward through the vortex chamber until it reaches the top of the chamber. The said emulsified water then flows over the periphery 7a, of the chamber and the gas tends to pass on upward, through vertical pipe 9, through an air filter 10, and out by an outlet 11, to the atmosphere.

The periphery 7a of the top of the vortex chamber affords a very considerable length of edge, or dam, over which the water can flow at a sufficiently low velocity to permit the escape of the entrained ozonized gas. Further opportunity for the gas to escape is afforded by a baffle 12 formed by a flange depending from the cover 13 of a water tank 14 that is mounted upon the said vortex chamber. The water having to pass through the annulus formed by the outer wall of the vortex chamber and the inner surface of the said baffle, on its way to the receiving tank 14, permits any entrained gas which is still in the water to rise from the water as the water descends, the said gas passing out through the aforesaid filter. While the said baffle is an advantage where needed, it is to be understood that in case of a sufficiently large vortex chamber, so that the surface velocity of the water is very slow, the baffle need not be used.

The water may be drawn off from the receiving tank through the valve 15. The receiving tank may also be provided with an electric switch 16 for controlling the level of the water in the water receiving tank such as the water level switch 96 which is shown in my aforesaid application for patent, the said switch being preferably operated by the pressure of the water so as to control the entrance of water into the apparatus through the pipe 5 and prevent the water rising above a predetermined level.

My air filter 10 serves as a "breather" for a vortex tank and the receiving tank, allowing ozonized air to escape when the machine is running, and permitting the entrance of air to displace the water, when the machine is shut down, and when water is drawn from the receiving tank; or to state the matter in another way, to admit air pressure to the upper surface of the water in the receiving tank for the purpose of counterbalancing the atmospheric pressure upon the water in the outflow pipe 15, which under certain circumstances would prevent water from being drawn off.

The receiving tank 14 is also provided with an overflow pipe 17 which is connected with a T 18, the lower branch of said T having a pipe 19 which dips into a water seal, or liquid trap 20, the latter having a pipe 21 mounted in the bottom of the trap and extending to a level above the bottom of the pipe 19, so that a body of water will be entrapped in the said trap. Thus, water can escape from the said receiving tank through said overflow and into the sewer by the pipe 21 and yet the sewer gas will be prevented from rising through pipe 19 and reaching the said receiving tank. In order to insure that the liquid trap shall always be full of water, an overflow pipe 22 from the said injector 3 is connected with the upper arm of the said T 18 and preferably passes down through the pipe 19 below the top of pipe 21 in said trap. The said pipe 22 is required, so as to prevent the injector from drawing air from the receiving tank, and the trap 20 must be located sufficiently below the injector to prevent the injector from lifting water from the said seal or trap.

Ozone-water purifiers are frequently used in beverage and food product plants where the sterilizing action of a stream of emulsified ozone and water can be employed to an advantage in cleaning vessels, pipes, etc. In order to make such use possible, I place a three-way valve 23 in the coil 6 before the entrance to the vortex chamber, so that suitable pipe connections can be made for directing the stream where it is desired. A quarter turn of the valve handle shuts off the vortex chamber, and directs the stream from the coil 6 into a pipe 24 attached to the said three-way valve.

For the purpose of shutting down a machine in case the water seal 20 should become empty, a condition which would allow the suction of sewer gas into the injector, I provide the machine with the following parts:

A vacuum switch 25 is connected into the overflow pipe 22 of the injector 3, which pipe extends into the trap or water seal 20. The vacuum switch, which may be of any well known construction, is so arranged that when the said trap 20 is properly full of water, the suction caused by the passage of the water through the injector, under normal pressure, will cause the movable arm or hand 26 of the said vacuum switch to contact with a segment 27 on the said vacuum switch, which segment is connected by wires 28 and 29 with the magnet of the electrically operated valve 2, and the magnet will lift and hold its valve off of its seat, so that water from the mains may flow through the injector, drawing ozonized air from the ozone generator and intimately mixing it with the water. On the other hand, when the vacuum is broken, by the absence of water in said trap 20 the said arm 26 will contact with a segment 30 on the said vacuum switch, and throw the current through wire 31 and through the thermal-relay or cut-out 32. This thermal-relay can be of any well known construction. Its thermal element becomes heated on the passage of the current, and this increases the resistance of such element, and reduces its conductivity, so that, after a predetermined interval, say half a minute, the current is shut off sufficiently so that the magnet of the valve 2 becomes inoperative and the valve is forced to its seat under the action of gravity and of its spring and the water ceases to flow through the injector, and the apparatus stops functioning. When the thermal-relay opens its circuit to the magnet, it will remain open until the relay is reset manually, and will continue open so long as the water seal lacks sufficient water, and even then unless the water supply and pressure be sufficient to create a proper vacuum when water has been supplied to the seal. In other words, my safety devices will stop the operation of the apparatus when there is either no vacuum, or when there is sufficient vacuum to suck the water out of the trap up into the injector, an operation which would again result in the absence of vacuum and in the operation of the thermal-relay. The vacuum caused in said switch by the operation of the injector with normal pressure and volume of water, but still insufficient to suck the water from the trap 20, will cause the hand of the vacuum switch to throw the current direct to the magnet in the valve by-passing the thermal-relay. But when the vacuum is broken, either by the absence of water in the trap 20 or by abnormal pressure in the injector emptying the trap, or subnormal pressure in the injector failing to create a normal vacuum, the vacuum switch will close the circuit to the thermal-relay, and after the pre-determined interval cut off the current to the magnet of the valve and cause all operation to cease.

To speak more in detail, if the water seal or trap 20 be empty, as by accident, and the apparatus is started running, then the injector would draw air direct through the pipe 22 into the injector and suck sewer gas instead of ozone into the machine, as there would be more resistance in the ozone line due to the ozone generator and dehydrator, than in the line 22. If the water seal be full of water, when the machine is started, then a vacuum will be created, which at the normal pressure of city water in the injector will be sufficient to draw ozone from the generator, but not enough to suck water from the seal or trap 20. But, if for any reason, the water pressure be suddenly increased, (as by fire pressure put on water lines in some cities) then the increased pressure in the injector might create enough vacuum to suck water out of the trap as well as through the ozone generator. One purpose of the vacuum switch is to prevent this action. For, under these conditions, the injector, will suck the water seal empty. This will break the vacuum and cause the current, instead of flowing directly to the magnet in the valve, to pass from the vacuum switch through the thermo-relay and cause the valve to close.

My arrangement makes it necessary at all times for the operator to see that the water seal is full; and it will protect the machine against sewer gas and from the water pressure that would operate the machine above its rated capacity. If the water seal is empty, absence of vacuum will cause the vacuum switch to send the current through the thermal-relay, which will cut off the current in half a minute and stop the apparatus. If, on the other hand, the water pressure on the supply is increased for any reason, as for instance due to fire pressure being applied to the lines, the increased pressure of the water in the injector would increase the vacuum formed by the injector and suck the water out of the trap and when that was emptied would then draw sewer gas from the sewer.

It will be observed that I have provided an apparatus for the purification of water with ozone which is compact and which requires but a relatively small amount of space. Also that in my said apparatus the water and ozonized gas are maintained in the highly emulsified condition in which they leave the injector, for a relatively very long time, first in the coil 6 and again in the vortex chamber 7, so that every particle of the water is exposed to the ozone and for a length of time affording abundant opportunity for the reaction between the ozone and the impurities in the water.

Furthermore, the mounting of the receiving tank upon and around the vortex tank not only makes for compactness, but it affords very efficient means for separating the entrained gas from the water, prior to the delivery of the water to the receiving tank.

My apparatus also affords a passage for the overflow of excess water to the sewer while ensuring that the sewer gas shall not enter the receiving tank or the vortex chamber.

What I claim is:

1. In a mixing device, the combination of a source of raw water, a source of ozonized gas, an injector connected with each of said sources, a relatively long coil connected to the discharge of said injector, and an upright vortex chamber of relatively large cross sectional area, said coil surrounding a portion of said chamber and discharging its emulsified water and gas tangentially into said chamber.

2. In a mixing device, the combination of a source of raw water, a source of ozonized gas, an injector connected with said sources, a coil connected to the discharge to said injector, a vertical vortex chamber, said coil surrounding said vortex chamber and admitting the emulsified water and gas to said chamber in a tangential direction.

3. In a mixing device, the combination of an injector, means for supplying raw water and ozonized gas thereto, a vertical vortex chamber, a pipe connecting said injector with said vortex chamber, a receiving tank for the treated water mounted on the upper portion of said vortex chamber, concentrically therewith, and a single cover for said vortex chamber and receiving tank.

4. In a mixing device, the combination of an injector, means for supply raw water and ozonized gas thereto, a vertical vortex chamber, a pipe connecting said injector with said vortex chamber, a receiving tank for the treated water mounted on the upper portion of said vortex chamber, concentrically therewith, and a single cover for said vortex chamber and receiving tank, said cover being provided with an overflow port, said overflow port being protected by a water seal or trap.

5. In a mixing device, the combination of an injector, means for supplying raw water and ozonized gas thereto, a vertical vortex chamber, a pipe connecting said injector with said vortex chamber, a receiving tank for the treated water mounted on the upper portion of said vortex chamber, concentrically therewith and a single cover for said vortex chamber, and receiving tank, said cover being provided with a vent having an air filter.

6. In an apparatus for ozonizing water, the combination of an injector, electric means for supplying raw water to said injector and means for supplying ozonized gas to said injector, an overflow pipe for the water in said injector, a trap for said pipe, and means connected with said system so that when a partial vacuum exists in said means, but insufficient to draw water from said trap, current shall be supplied to said means for supplying water, and means by which when said trap lacks water, said current shall be shut off.

7. In an apparatus for ozonizing water the combination of an injector, electric means for supplying raw water to said injector, and means for supplying ozonized gas to said injector, an overflow pipe for the water in said injector, a trap for said pipe, and means connected with said system so that when a partial vacuum exists in said means, but insufficient to draw water from said trap, current shall be supplied to said means for supplying water, and means by which, when said trap lacks water, said current shall be shut off after a timed delay.

8. In an apparatus for ozonizing water, the combination of an injector, electric means for supplying raw water to said injector, and means for supplying ozonized gas to said injector, an overflow pipe for the water in said injector, a trap for said pipe a vacuum switch connected with said system so that, when a partial vacuum exists in said switch, but insufficient to draw water from said trap, current shall be supplied to said means for supplying water, and means by which when said trap lacks water, said current shall be shut off.

9. In an apparatus for ozonizing water the combination of an injector, electric means for supplying raw water to said injector, and means for supplying ozonized gas to said injector, an overflow pipe for the water in said inector, a trap for said pipe, a vacuum switch connected with said system so that, when a partial vacuum exists in said switch, but insufficient to draw water from said trap, current shall be supplied to said means for supplying water, and a delayed relay by which, when said trap lacks water, said current shall be shut off.

10. In an apparatus for ozonizing water, the combination of an injector, electric means for supplying raw water to said injector, and means for supplying ozonized gas to said injector, an overflow pipe for the water in said injector, a trap for said pipe, a vacuum switch connected with said system so that, when a partial vacuum exists in said switch, but insufficient to draw water from said trap, current shall be supplied to said means for supplying water, and a thermal-relay by which when said trap lacks water, said current shall be shut off.

11. In a mixing device, the combination of a source of raw water, a source of ozonized gas, an injector connected with each of said sources, a relatively long coil connected to the discharge of said injector and an upright voretex chamber of relatively large cross sectional area, said coil being positioned externally of said chamber and discharging its emulsified water and gas tangentially into said chamber.

12. In a device of the character described, the combination of a source of supply of water, a source of supply of ozonized gas, an injector connected with said sources, a vortex chamber, a relatively long pipe connected to said chamber and said injector, said pipe being in the form of a coil whereby the ozone and water are thoroughly intermixed and kept in intimate contact for an extended period of time.

13. In a mixing device, the combination of an injector, means for supplying raw water and ozonized gas thereto, a vertical vortex chamber, a pipe connecting said injector with said vortex chamber, and a receiving tank for the treated water mounted on the upper portion of said vortex chamber concentrically therewith, said pipe being in the form of a coil and being positioned beneath said receiving tank.

HARRY BUXTON HARTMAN.